(12) United States Patent
Agarwal et al.

(10) Patent No.: US 11,297,513 B2
(45) Date of Patent: Apr. 5, 2022

(54) SYSTEM FOR ADMINISTERING TEST CASES FROM A MOBILE DEVICE FOR A TELECOMMUNICATIONS NETWORK

(71) Applicant: T-Mobile USA, Inc., Bellevue, WA (US)

(72) Inventors: Bikash Agarwal, Bothell, WA (US); Artem Kovtunenko, Kirkland, WA (US); Nidhin Menon, Bothell, WA (US); Madhuri Kotta, Bellevue, WA (US); Sharmeelee Bijlani, Lynnwood, WA (US); Wen Shu, Federal Way, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 10 days.

(21) Appl. No.: 16/909,941

(22) Filed: Jun. 23, 2020

(65) Prior Publication Data
US 2021/0400512 A1 Dec. 23, 2021

(51) Int. Cl.
*H04B 17/00* (2015.01)
*H04B 17/29* (2015.01)
(Continued)

(52) U.S. Cl.
CPC ........ *H04W 16/22* (2013.01); *H04B 17/0085* (2013.01); *H04B 17/29* (2015.01); *H04B 17/382* (2015.01); *H04L 41/16* (2013.01); *H04L 41/22* (2013.01); *H04L 41/28* (2013.01); *H04L 43/045* (2013.01); *H04L 43/12* (2013.01); *H04L 43/50* (2013.01); *H04L 63/102* (2013.01); *H04L 63/105* (2013.01); *H04L 63/108* (2013.01); *H04M 1/24* (2013.01); *H04M 3/2263* (2013.01); *H04M 7/0078* (2013.01); *H04W 12/062* (2021.01); *H04W 12/082* (2021.01);
(Continued)

(58) Field of Classification Search
CPC ....... H04B 17/0082–3913; H04L 41/02–5096; H04L 43/02–50; H04L 63/02–308; H04L 65/10–80; H04M 1/24; H04M 3/22–367; H04M 7/006–0087; H04M 2203/05–058; H04W 12/009–80; H04W 16/22–225; H04W 24/02–10; H04W 60/005–06; H04W 80/02–12; H04W 88/18–188
See application file for complete search history.

(56) References Cited

U.S. PATENT DOCUMENTS 7,086,089 B2    8/2006   Hrastar et al.
7,171,157 B2    1/2007   Lee
(Continued)

*Primary Examiner* — Timothy J Weidner
(74) *Attorney, Agent, or Firm* — Perkins Coie LLP

(57) ABSTRACT

The disclosed technology includes at least one method that enables a user of a wireless mobile device to remotely administer test cases that check the performance of telecommunications network nodes. The method includes authenticating a user for a limited time period in which the user can remotely administer the test cases. While being temporarily authenticated, the user can configure the test cases by associating services or operations with particular nodes. The executed test cases cause the nodes to generate data that indicate performance of the nodes in response to the services or operations. The results can be displayed at the mobile device used to remotely administer the test cases.

20 Claims, 5 Drawing Sheets

(51) Int. Cl.

| | |
|---|---|
| H04B 17/382 | (2015.01) |
| H04L 12/24 | (2006.01) |
| H04L 12/26 | (2006.01) |
| H04L 29/06 | (2006.01) |
| H04M 1/24 | (2006.01) |
| H04M 3/22 | (2006.01) |
| H04M 7/00 | (2006.01) |
| H04W 12/062 | (2021.01) |
| H04W 12/082 | (2021.01) |
| H04W 12/61 | (2021.01) |
| H04W 16/22 | (2009.01) |
| H04W 24/06 | (2009.01) |
| H04W 24/08 | (2009.01) |
| H04W 24/10 | (2009.01) |
| H04W 88/18 | (2009.01) |
| H04L 41/16 | (2022.01) |
| H04L 41/22 | (2022.01) |
| H04L 43/045 | (2022.01) |
| H04L 43/12 | (2022.01) |
| H04L 43/50 | (2022.01) |
| H04L 41/28 | (2022.01) |

(52) U.S. Cl.
CPC .......... *H04W 12/61* (2021.01); *H04W 24/06* (2013.01); *H04W 24/08* (2013.01); *H04W 24/10* (2013.01); *H04W 88/18* (2013.01)

(56) References Cited

U.S. PATENT DOCUMENTS

| | | |
|---|---|---|
| 7,630,708 B2 | 12/2009 | So et al. |
| 7,925,740 B2 | 4/2011 | Nath et al. |
| 8,265,619 B1 | 9/2012 | Hyde et al. |
| 8,315,655 B1 | 11/2012 | Cole |
| 8,325,614 B2 | 12/2012 | Poon et al. |
| 8,386,773 B2 | 2/2013 | Sherkin et al. |
| 8,531,972 B2 | 9/2013 | Poon et al. |
| 8,818,354 B1 | 8/2014 | Bennett |
| 8,954,744 B2 | 2/2015 | Sherkin et al. |
| 9,071,989 B2 | 6/2015 | Capers et al. |
| 2003/0037155 A1 | 2/2003 | Lee |
| 2003/0069011 A1* | 4/2003 | Bonnifait ............ H04M 3/2236 |
| 2003/0236990 A1 | 12/2003 | Hrastar et al. |
| 2006/0205397 A1 | 9/2006 | So et al. |
| 2006/0205398 A1 | 9/2006 | Seckendorf et al. |
| 2006/0259629 A1 | 11/2006 | Usmani et al. |
| 2007/0026854 A1 | 2/2007 | Nath et al. |
| 2007/0202868 A1 | 8/2007 | Adams et al. |
| 2008/0151761 A1 | 6/2008 | Theisen et al. |
| 2008/0254790 A1 | 10/2008 | Baldridge et al. |
| 2009/0003221 A1* | 1/2009 | Burns .................... H04L 43/50 |
| 2009/0175177 A1 | 7/2009 | Schwann |
| 2009/0209250 A1 | 8/2009 | Huq |
| 2010/0144314 A1 | 6/2010 | Sherkin et al. |
| 2011/0164511 A1 | 7/2011 | Poon et al. |
| 2013/0144788 A1 | 6/2013 | Sherkin et al. |
| 2013/0196600 A1 | 8/2013 | Capers et al. |
| 2015/0049608 A1 | 2/2015 | Palm et al. |
| 2015/0382208 A1 | 12/2015 | Elliott et al. |

* cited by examiner

SYSTEM FOR ADMINISTERING TEST CASES FROM A MOBILE DEVICE FOR A TELECOMMUNICATIONS NETWORK

BACKGROUND

As the telecommunications industry evolves, networks have become more complicated and radio communications technologies have advanced rapidly. To compete for more subscribers, network carriers seek to lower service charges, improve subscriber services, and reduce network maintenance costs. To satisfy subscriber demands for high quality communications, network carriers design and test network nodes to ensure that they satisfy rigorous standards and provide reliable performance.

In a telecommunications network, an IP Multimedia Subsystem (IMS) is a standards-based architectural framework created by the 3rd Generation Partnership Project (3GPP) for delivering multimedia communications services such as voice, video, and text messaging over IP networks. An IMS core includes nodes such as a telephony application server (TAS) and call session control function (CSCF) that perform complex functions to support user services. A network carrier that seeks to test the performance of an IMS node normally runs test cases (e.g., voice calls) on the network and collects data about the performance of the IMS node during the voice calls.

BRIEF DESCRIPTION OF THE DRAWINGS

Embodiments of the present technology will be described and explained through the use of the accompanying drawings.

Figure 1:
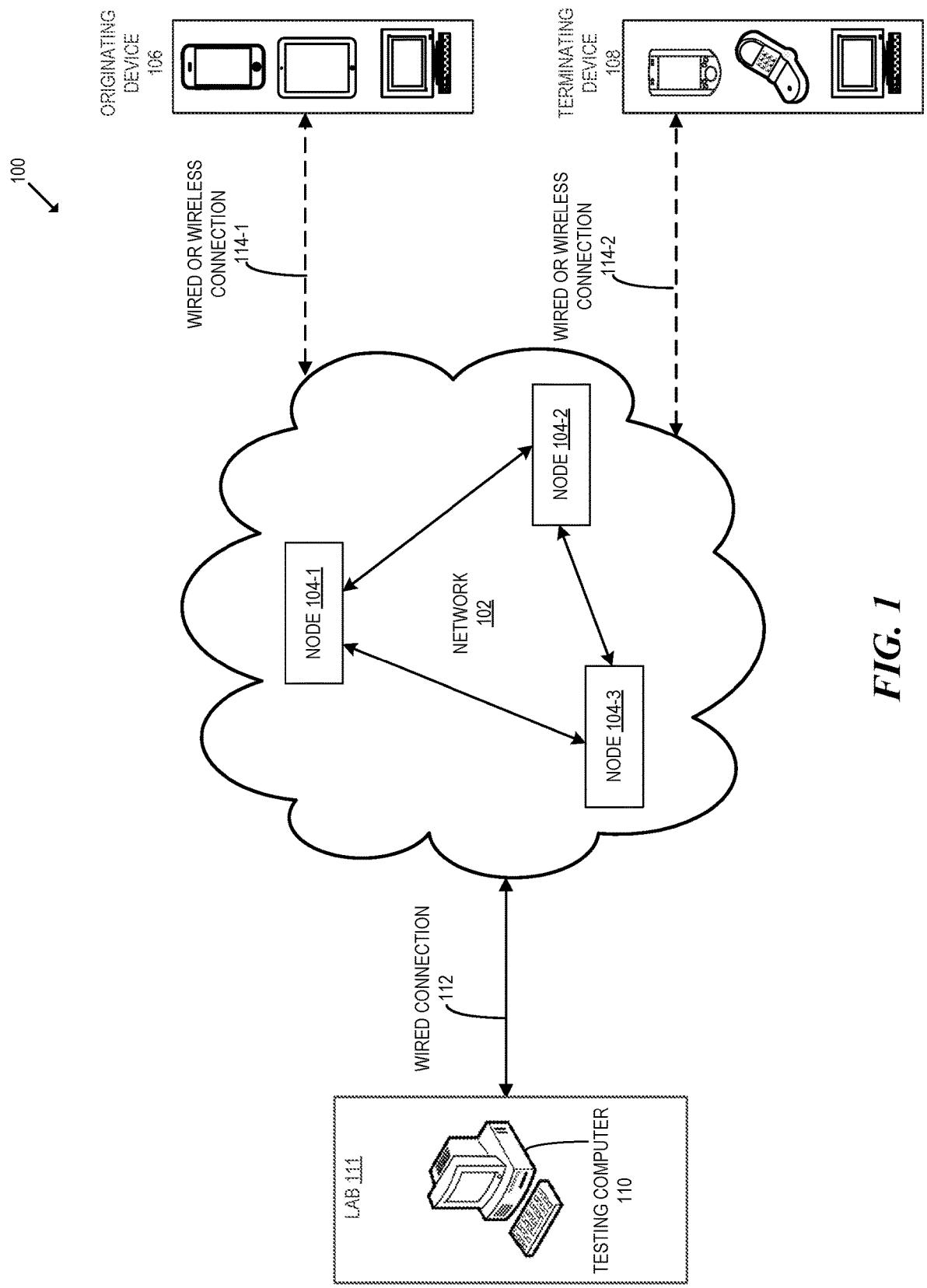
FIG. 1 is a block diagram that illustrates a system for testing a network node from a test lab that has a wired connection to the network.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The ability to execute test cases on a telecommunications network is critical to assess reliability and performance, detect vulnerabilities, and test new technologies. Existing testing tools allow analysts to test core network nodes such as a Telephony Application Server (TAS) node and a Call Session Control Function (CSCF) node. The testing tools require an analyst device to directly connect to the network through, for example, a virtual private network (VPN) while onsite at a testing lab. As used herein, a "test case" can refer to a specification of inputs, execution conditions, testing procedure, and/or expected results that define a single test to be executed to achieve a testing objective, such as to exercise a program path or to verify compliance with a specific requirement. An example of a test case involves performing a Voice over Long-Term Evolution (VoLTE) call on the network through one or more network nodes to determine the reliability or performance of a node. A tested node generates data (e.g., fail, interrupt) during the test call, which can be used to determine a test result.

In conventional test systems, a test engineer uses a computing device that has a direct wired connection from a lab to the network, which provides a physical and secure connection to execute a test case. As such, the conventional system has a wired connection to all the network elements and the backend support for the successful execution of a test case or a test suite, which includes test tools and devices. The computing device is in the lab such that all tests must be performed from that same location. All tests are performed in this manner to avoid unauthorized attempts to use testing as a backdoor for malicious activity. Hence, conventional test systems are severely restrictive due to their limited testing locations, which impairs field testing without burdensome efforts to coordinate a team and, among other things, constrains testing to times when a test engineer can reasonably expect to have access to the lab.

The disclosed technology improves over existing systems for testing telecommunications networks by allowing test engineers to perform test cases remotely from a wireless mobile device (also referred to herein simply as a "mobile device"). Hence, a test engineer can perform tests cases without needing to be onsite at a lab location. The technology includes features in at least three areas to improve over existing systems. Those areas include remote security, test setup, and test execution. For example, the technology can implement a security mechanism to mitigate the risk of malicious activity that could affect the network. In one implementation, a user pre-registers with the testing system and can access the testing system after being authenticated by receiving a token from the system (e.g., via a text message), which the analyst can copy-and-paste into a testing app on the mobile phone to authenticate the analyst or mobile phone and thereby obtain access to the testing system, only for a limited time. The disclosed technology further improves over existing systems by implementing a bot, which is a software application that runs automated tasks (scripts) through testing app. The bot can interpret natural language commands (e.g., text or voice) to execute complex automated test cases from the mobile phone and obtain test data including test results.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

FIG. 1 is a block diagram that illustrates a system 100 for testing a node of a telecommunications network from a test lab that has a wired connection to the network. The network 102 represents any network that includes interconnected network nodes 104 (also referred to individually as network node 104-1 through 104-3 or network node 104). In one example, the network 102 is a telecommunications network that includes an Internet Protocol (IP) Multimedia Subsystem (IMS) with IMS nodes.

The IMS nodes perform a collection of different functions, linked by standardized interfaces, which grouped form one IMS administrative network. A function is not necessarily a conventional network node (e.g., hardware box). For example, in implementation can combine two or more functions in one network node or split a single function into two or more nodes. Each node can also be present multiple times in a single network, for dimensioning, load balancing, or organizational reasons.

A user device can connect to the IMS network in various ways, most of which use standard IP. IMS terminals or user equipment (UE) (e.g., mobile phones, personal digital assistants, computers) can register directly on the IMS, even when they are roaming in another network or country (the visited network). The only requirement is that they can use IP and run SIP user agents. Fixed access (e.g., digital subscriber line (DSL), Ethernet), mobile access (e.g. W-CDMA, CDMA2000, GSM, GPRS) and wireless access (e.g., WLAN, WiMAX) are all supported. Other phone systems like plain old telephone service (POTS), H.323 and non IMS-compatible systems, are supported through gateways. As such, communication sessions are routed through the network 102 from an originating device 106 (e.g., a voice over IP (VoIP) telephone and/or plain old telephone service (POTS) telephone) to a terminating device 108. The originating device 106 connects to the network 102 through a wired or wireless connection 114-1 and the terminating device 108 connects to the network 102 through a wired or wireless connection 114-2.

Examples of the network nodes 104 include a telephony application server (TAS), which provides telephony applications and additional multimedia functions. Alongside other components of the IMS network that provide call control and media transformation, a TAS performs functions including to emulate the calling features provided by the PSTN. This function is called the PSTN Emulation Subsystem (PES), and can include calling features like call forwarding, voicemail, and conference bridges. Another function of a TAS is to provide additional multimedia features and flexibility previously unavailable on the PSTN, and can include features like unified messaging, video calling, and the integration of softphone clients on multiple devices. Another example of the network nodes 104 is a Call Session Control Function (CSCF), which manages signaling from the end user to services and other networks. CSCF can control both fixed and mobile IMSs, containing functional modules to manage signaling from end user, allocating application servers, establishing emergency connections, and controlling communication with other networks.

The network 102 can undergo testing for a variety of reasons. For example, the network carrier can seek to run tests cases of VoLTE calls between the originating device 106 and the terminating device 108 to test any of the network nodes 104-1 through 104-3 or to test any new type of originating device 106 or terminating device 108 using the network 102. The testing, however, requires a test engineer to connect a testing computer 110 to the network 102 over a direct wired connection 112 through a virtual private network (VPN) from a testing lab 111 to execute test cases.

An example of a test case includes a VoLTE call across the network 102 through one or more of the network nodes 104. Any data (e.g., events) that are generated by the test call (e.g., fail, interrupt) can be used to obtain a test result. The test data and test result are provided to the test engineer through the test computer 110 at the lab 111. Accordingly, testing is a rigid process that requires onsite access to a lab 111 where the testing computer 110 has a wired, direct, and/or secure connection 112 to the network 102. The lab 111 can include various tools to initiate an execution of the test case. For example, the testing computer 110 has backend access to handset (e.g., originating device 106, terminating device 108) to trigger the execution of a test suite using the VPN. The secure VPN includes a tunnel created in the wired connection 112, and the network 102 can be any network or the system under for testing, such as an Enhanced Packet Core (EPC) or an IMS core. As such, the system 100 has limited capabilities because test engineers must be onsite at the lab 111 to test any of the nodes 104 of the network 102, which is inconvenient and burdensome because testing could involve coordinating with a team of test engineers on the field to perform test cases only while the lab 111 is accessible or available.

Figure 2:
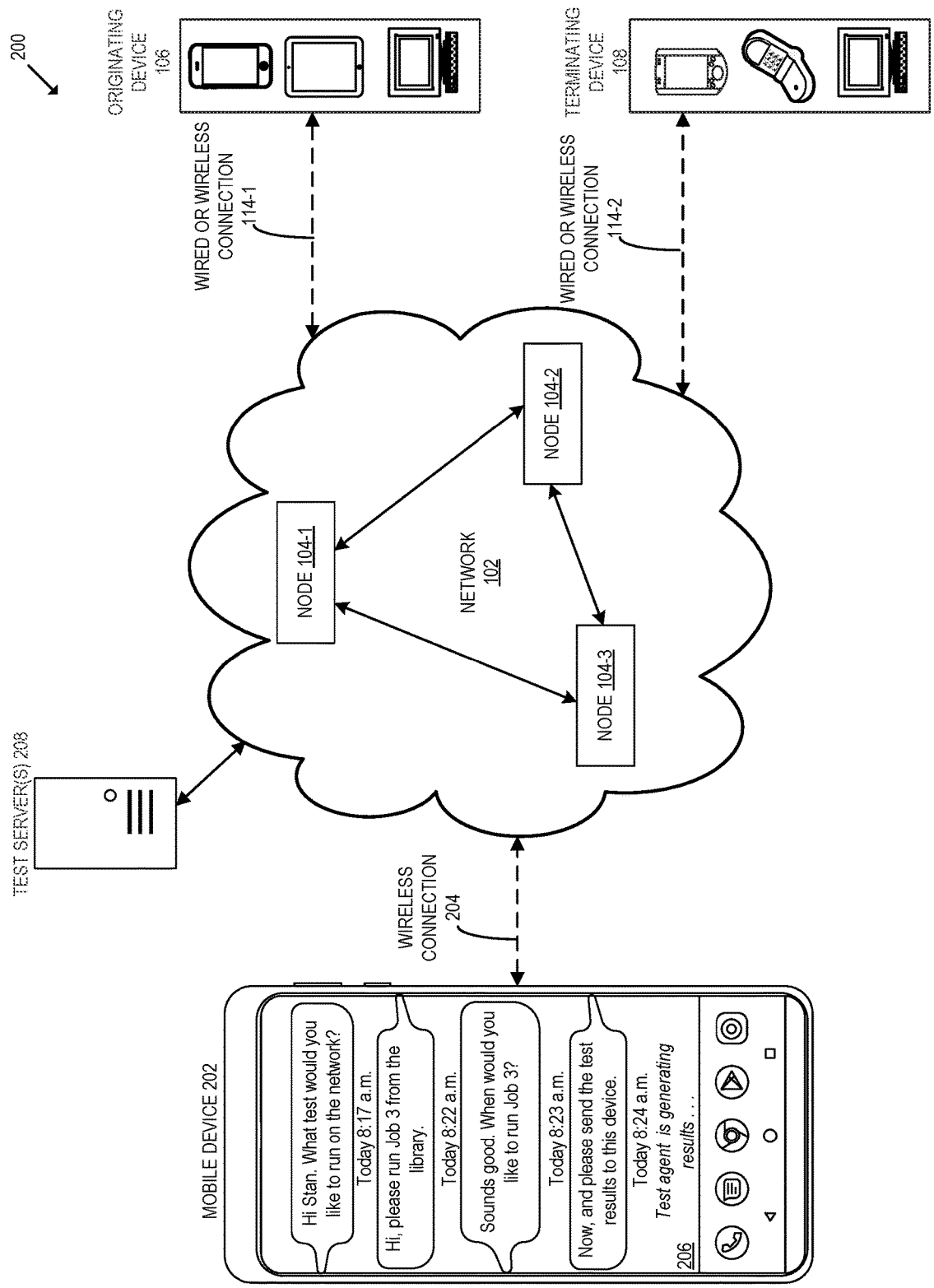
FIG. 2 is a block diagram that illustrates a system for testing network nodes from a wireless mobile device that is wirelessly connected to the network.

The disclosed technology improves over existing testing systems at least because test engineers can test core network nodes from a mobile device. For example, FIG. 2 is a block diagram that illustrates a system 200 for testing network nodes 104 from a mobile device 202 that has a wireless connection 204 to the network 102.

The test engineer can use the mobile device 202 to remotely cause one or more test servers 208 to perform tests without needing to be onsite at a lab location. The technology includes various features to improve over existing systems. Those features relate to providing remote security, test setup, and test execution. Regarding security, the technology can implement multi-factored authentication that prevent malicious activity despite the mobile device 202 being untethered from a location.

In one implementation, a user (e.g., test engineer) pre-registers with the test server(s) 208, which can implement a two-way authentication technique to authenticate the registered user later when attempting to access the test server(s) 208. For example, the user can input credentials (e.g., username and password) through a user interface (UI) of a testing app 206 on the mobile device 202. The credentials are received by the test server(s) 208 and, in response, the test server(s) 208 send a security token in a text message to the mobile device 202, which the user can copy-and-paste into the UI of the testing app 206. The test server(s) 208 can verify the authenticity of the security token and thereby allow the user to administer a test of a network node, but only for a limited time period.

Regarding test setup and execution, the mobile device 202 can implement a bot, which is a software application that runs automated tasks (scripts) through the testing app 206. The bot can interpret natural language commands (e.g., text, voice commands) to administer complex automated test cases from the mobile device 202 and obtain test data including test results. In particular, the bot can follow a test protocol, which includes a multi-branched series or sequence of logical steps of a workflow to test network nodes. As such, the bot operates in accordance with a set of rules that can be customized for a particular user, a particular type of user, a group of users, etc. Examples of a bot mechanism include a chat messenger, SMS text, or voice recognition mechanism, or other input mechanisms that can be used to facilitate user engagement.

The bot can provide automated or semi-automated communications via the mobile device 202. In one example, a bot is partially automated such that a human agent could influence the way the bot operates in real-time or near real-time while engaged with a user. The bot can engage the user with a simulated conversation as part of a computer-implemented technique for automating test cases via the mobile device 202 to facilitate setup and execution of tests and obtain a test result in accordance with a test protocol. In some embodiments, the bot could operate as a virtual agent that mimics a real human being. As such, the user of a mobile device 202 can engage in a simulated natural conversation as if the user was speaking with a human agent.

In the example illustrated in FIG. 2, the mobile device 202 is a smartphone that runs a testing app 206 that presents an interactive conversation between a test engineer named Stan and a virtual test agent. The conversation can engage the test engineer in a manner that extracts inputs and/or contextual information that is used to perform testing. Although embodied on a smartphone, the testing app 206 can run on any computing device or platform that allows the user to engage in a conversation. The testing app 206 can be included in an app or be part of an operating system (OS) of a smartphone or other computing device. The conversation illustrated on the UI of the testing app 206 engages the test engineer in the following dialog:

Test agent: "Hi Stan. What test would you like to run on the network?"

Test engineer: "Hi, please run Job 3 from the library."

Test agent: "Sounds good. When would you like to run Job 3?"

Test engineer: "Now, and please send the test results to this device."

In this example, the testing app 206 further shows an indication at the bottom of the UI that the test agent is generating results for the test engineer.

The disclosed technology thus enables more independent testing that is readily available to users from any location by using a mobile device. Moreover, the test platform can be integrated into different network frameworks such that the platform is interoperable and can readily download updates to reduce downtime.

The embodiments of the bot are not limited to executing on the mobile device 202. Instead, for example, a virtual agent can execute at any computing device including a server computer, a desktop computer, wearable device, a vehicle, etc. In one example, the virtual agent can run on a smartwatch that is communicatively coupled to a smartphone that relays voice-based interactions from the user to the test server(s) 208. In another example, the user can communicate commands and receive feedback from the virtual agent running on the test server(s) 208.

Figure 3A:
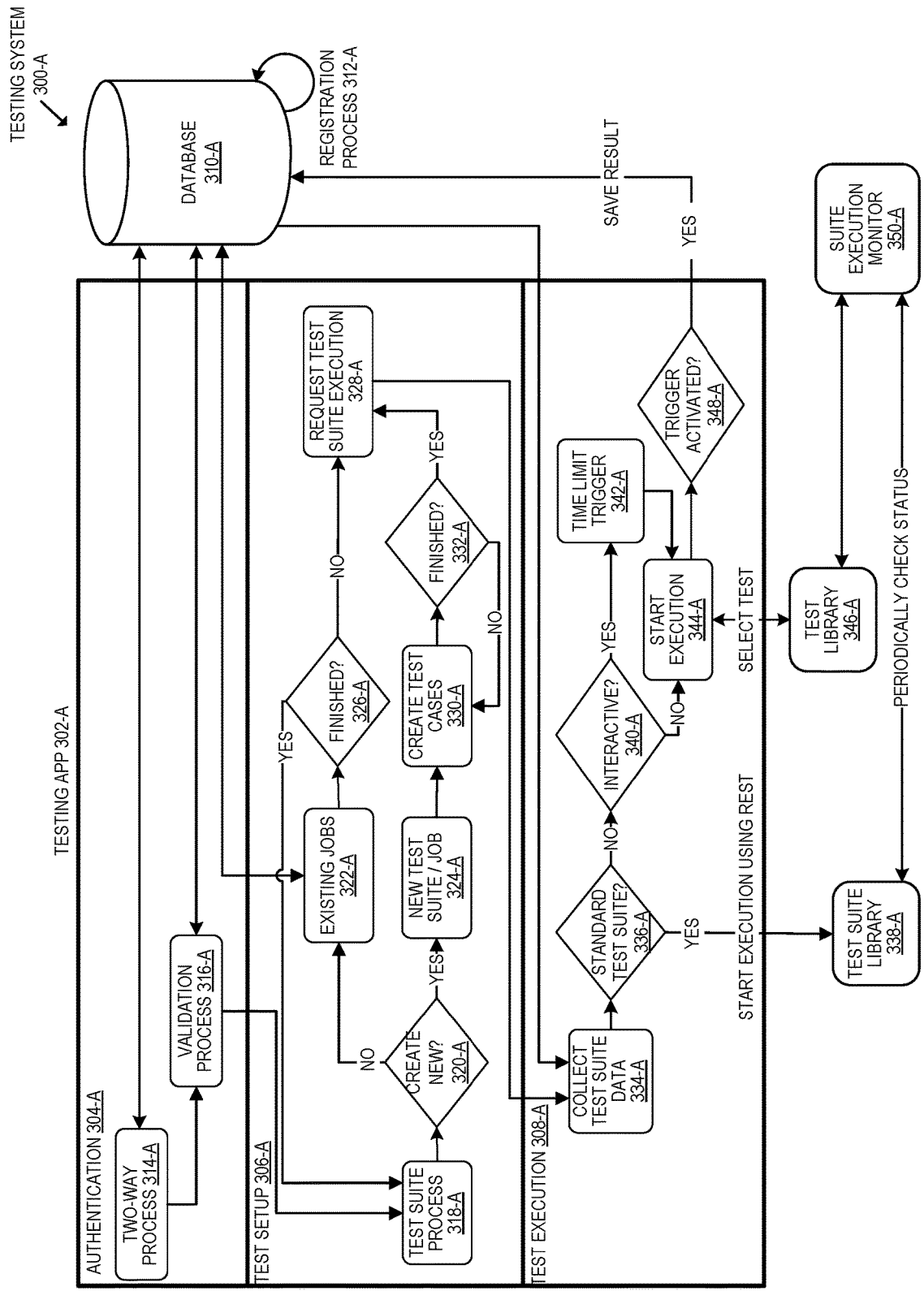
FIG. 3A is a block diagram that illustrates an architecture of a testing system and a test protocol of an application a wireless mobile device.
Figure 3B:
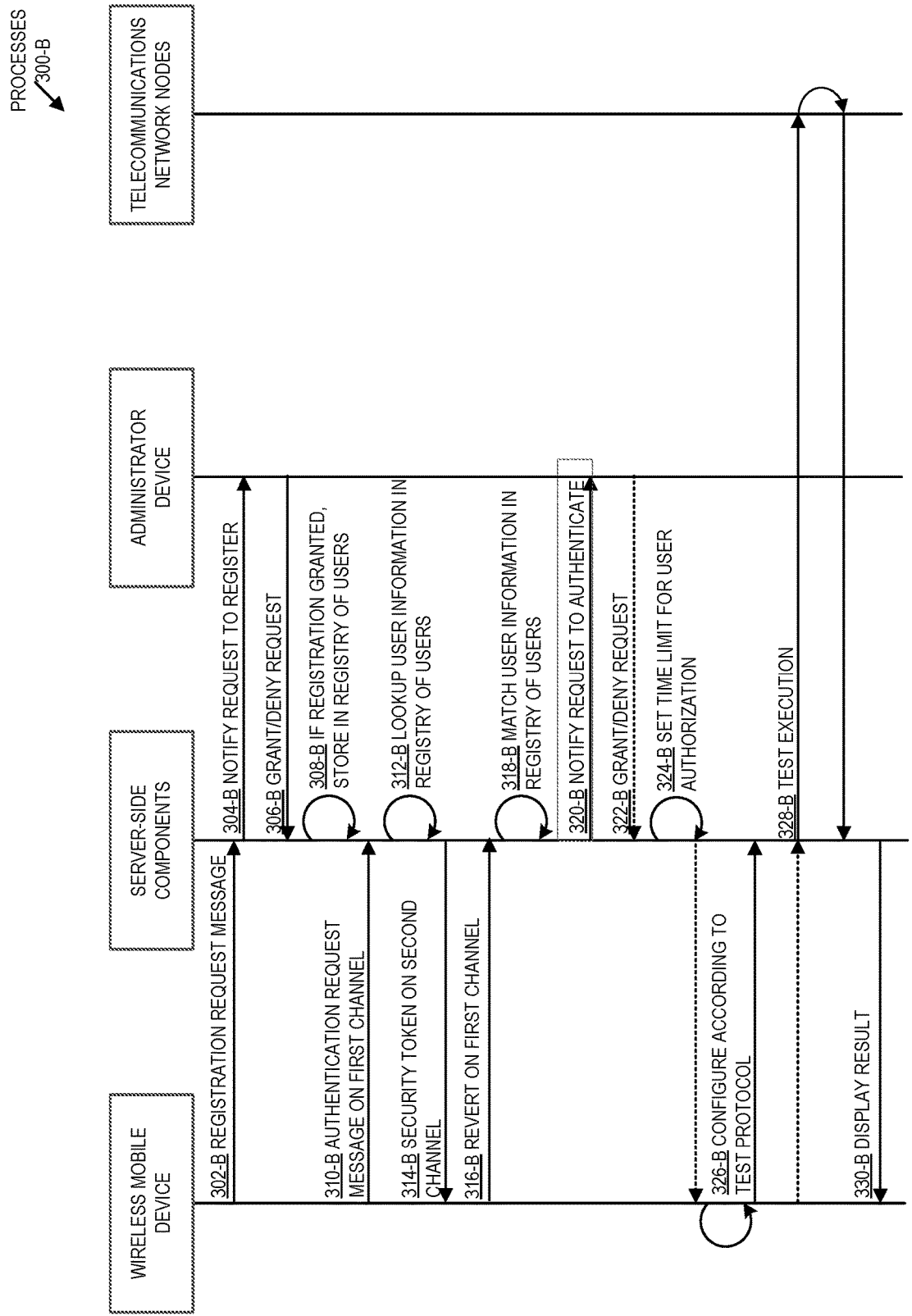
FIG. 3B is a flow diagram that illustrates processes performed by the testing system.

FIG. 3A is a diagram that illustrates an architecture of a testing system 300-A ("system 30") and a test protocol of an application on a mobile device. The related FIG. 3B is a flow diagram that illustrates processes 300-B performed by the system 30. The system 300-A includes hardware and/or software components that are distributed as one or more "server-side components" that are interconnected and have a hardwired connection to the network. The server-side components can be located collectively (e.g., server computer(s)) at a testing lab and connect directly to the network. The system 300-A includes "client-side components" such as a wireless mobile device (e.g., mobile device) and a testing app that is remotely located from the server-side components.

Examples of the mobile device includes a smartphone or tablet computer that can wirelessly connect to a server computer and/or a telecommunications network. In one example, the mobile device is a mobile phone that subscribes to a service supported by the telecommunications network and/or that utilizes another network (e.g., Wi-Fi network) to remotely access the server-side components. The mobile device can couple to the server-side components while on the same telecommunications network or through a different telecommunications network. Hence, the mobile device does not need to be physically co-located with the server-side components.

The client-side components shown in FIG. 3A include a testing app 302-A, which is a mobile software app that runs on the mobile device, which can communicatively couple to the server-side components. The server-side components shown in FIG. 3A are illustrated as distributed components; however, many of the server-side components could be located at the same server computer or cluster of server computers (e.g., test server(s) 208). A user can download, install, and launch the testing app 302-A on the mobile device. The testing app 302-A illustrates a dataflow for an example test protocol in the context of authentication 304-A, test setup 306-A, and test execution 308-A. Moreover, in some embodiments, the testing app 302-A can run an automated algorithm such as a virtual agent that enable natural human interactions by the user with the testing app 302-A in accordance with the testing protocol.

The system 300-A can require registration of the user before allowing the user to remotely administer a test cases from mobile device. That is, to run automated test cases with the testing app 302-A, the user must be registered with the system 300-A beforehand. The user registration information is stored at a registry such as in database 312-A, which can include a list of users and their associated credentials (e.g., user names and passwords) that are required to authorize the users to run test cases from their mobile devices. The registration process 312-A can be performed by the server-side components of the system 30. For example, the server-side components can receive a registration request message to register the user with the system 300-A (at 302-B). The registration request message includes unique information that identifies the user. In response to the registration request message, a notification is communicated to a computing device of an administrator user of the testing system (at 304-B). The notification enables the administrator user to grant the registration of the user with the system 30. The server-side components then receive an indication that the administrator user granted or denied registration of the user with the system 300-A (at 306-B). In response to receiving the indication that the administrator user granted the registration, the registration of the user is stored at the registry of the database 312-A along with multiple registered users (at 308-B). If the administrator user denies the registration, the user is not allowed to access the system 30.

Once registered, the user can access the system 300-A to administer test cases. The user can select tests cases through the testing app 302-A and administer them from the mobile device. In some embodiments, the administrator user can modify the access to the system 300-A by any registered user, at any point in time. Hence, the administrator user is not required to decline or accept an initial request for a user registration. Instead, the decision to grant access can be deferred for a later point in time. In addition to the administrator user's ability to intervene in the registration process 312-A, the administrator user can readily view user information including user profiles to monitor tests administered by users.

Authentication

As indicated earlier, registration is a pre-requisite to authentication of the user, which allows the registered user to administer test cases from the wireless mobile device. The two-way authentication process 314-A is initiated by the user at the testing app 302-A. An example of the two-way authentication process 314-A is a multi-factor authentication process to authenticate a user with a test server coupled to a telecommunications network. For example, a user can initiate the two-way authentication process 314-A at the testing app 302-A to authenticate a user of the handheld mobile device with a testing system of the telecommunications network. The server-side components can receive an authentication request message issued by the mobile device to authorize a user of the mobile device to remotely administer a test protocol of the testing system from the mobile device (at 310-B). For example, the user can input authentication information such as a username and password or initiate authenticate with a fingerprint or face recognition program of the mobile device.

The authentication request message is communicated to the server-side components over a first type of communication channel and includes identifying information of the user. The authentication information is used to lookup user registration in the registry of the database 312-A. That is, in response to the authentication request message, the user is authenticated by matching identifying information in the registry of multiple registered users stored at the database 312-A (at 312-B). Upon matching the user authentication information, the server-side components communicate a security token to the mobile device over a second type (e.g., out-of-band) of communication channel as part of the validation process 316-A (at 314-B). For example, the first type of channel can be a mobile broadband channel and the second type of channel can be an SMS text-based channel. For example, the server-side components can communicate a numerical passcode to the mobile device running the testing app 302-A in a text message. The mobile device can automatically process the security token with the testing app 302-A or the user can manually copy-and-paste the security token in the UI of the testing app 302-A. The server-side components then receive a response message issued by the mobile device, received over the first type of channel and includes at least an indication of the security token (at 316-B). The user is authenticated by verifying the authenticity of the received security token (at 318-B). In another example, the server-side components can use OAuth Twilio authentication techniques such as using a social media application (e.g., Google, Facebook, Twitter) to authenticate a user.

In some embodiments, the authentication of the user requires the administrator user to confirm the authenticity of the user. For example, the server-side components can communicate a notification to the computing device of an administrator user of the system (at 320-B). The notification enables the administrator user to grant or deny the authenticity of the user required to remotely administer the test protocol from the wireless mobile device. The server-side components then receive an indication that the administrator granted or denied the authentication of the user (at 322-B).

In response to a successful authentication, the server-side components temporarily authorize the user to remotely administer a test protocol from the mobile device (at 324-B). The temporary authorization terminates upon expiration of a predefined time period during which the user is authorized to remotely administer a test protocol. In one embodiment, the mobile device can create a timestamp to set the beginning of the time period enforced by the mobile device or the server side-components. That is, the timestamp can be sent to the server-side components to trigger a countdown leading to the expiration of the temporary authorization. Thus, authentication grants the user access to administer test cases only during that time period (e.g., one hour) without needing reauthentication.

Test Setup

Upon successful authentication, a test setup can commence in accordance with the test protocol. For example, the user can access test resources such as preconfigured test cases stored at the database 312-A. Each test case can include a specific service or operation to be performed by the telecommunications network and/or indicate a specific node subject to an assessment. Moreover, successful authentication can instantiate a bot at the testing app 302-A. The bot can interact with the user in accordance with the test protocol to remotely setup and execute test cases for the telecommunications network as described earlier. As such, the user can remotely administer the test protocol based on an interaction between the user and the bot.

The test protocol can initiate a test suite process 318-A to build a test suite that includes one or more test cases. An example of a test case includes steps of a process that are performed to make VoLTE to VoLTE calls between a mobile origination (MO) device and a mobile terminating (MT) device. Another example of a test case includes a call made by the MO device that is not picked up by the MT device, such that the call goes to voicemail. Thus, a test case can include an execution component, collect system logs from the network 102 to confirm that the test case was executed and, based on the logs or events, classify whether the test case was a success or a failure. Thus, a collection of various test cases can constitute a test suite, which can be executed to ensure that a system is performing properly. For example, the test suite can include a collection of test cases to make sure functionality of the system is still intact, which is often referred to as a regression. The process of starting execution of a test suite and running to completion of the execution, including the gathering of the results and report, is referred to as a "job."

A group of test cases can have correlative features or functions or be completely different from one another but share a similar testing objective. From the testing app 32, the user can setup, configure, or stop a test case by selecting options displayed graphical user interface or submit commands such as "stop_configure Job 3," where Job 3 is an identifier of a job that was given when setup was initiated.

The user can configure the test suite, job, and/or test case through interactions on the testing app 302-A of the mobile device (at 326-B). A configuration of a test case can include specifying a service or operation to be performed by the network and specifying a node to be tested. For example, a test case can include a log collection automation script to collect log data of the tested node in response to a service or operation. An example of the service or operation is a voice call (e.g., VoLTE call). An example of the tested node is an IMS node (e.g., TAS or CSCF nodes). As such, the configured test case automates collection of log data generated by the tested IMS node during the voice call.

A job configuration can include adding multiple test cases for multiple nodes of the network. For example, the user can select each test case for each node as presented on the testing app 32. In some embodiments, the selected test cases are retrieved from a library of preconfigured test cases. The user can further configure the test cases or jobs for a desired test suite. Moreover, the test cases of a test suite can be the same or different for the same or different jobs.

In an embodiment where the testing app 302-A runs a bot, the configuration information can be received by the server-side components as instructions generated by the bot based on a natural language command input by the user of the mobile device. In particular, the bot can execute interactions with the user that follow the test protocol shown in FIG. 3A with respect to the test setup 306-A and/or test execution 38. For example, the testing app 302-A can provide options to create a test suite 320-A based on existing jobs 322-A and/or create an entirely new test suite or job 324-A.

In one implementation, the testing app 302-A can display a screen view of the UI with a list of existing jobs including test cases with existing log collection automations. For example, the user can add different nodes or virtual machines to an existing log collection automation. That is, a screen view of the UI can display selectable node types for test cases. Examples include WRG nodes, CSCF nodes, TAS nodes, ISBC nodes, BGCF_MRF nodes, E-CSCF_IWF nodes, cSBG Nodes, Wireshark nodes, etc. Once selected, the testing app 302-A can display names or identifiers of specific nodes of the network and associated network addresses. For example, if the user selects "WRG nodes," the testing app 302 can display a list of available network nodes including:
  OSPC: 10.145.190.235
  C7KC: 10.169.105.150
  C7KU2: 10.169.105.152
  C7KU1: 10.169.105.151
  OSPU: 10.145.190.236

In one example, each selected node or virtual machine belongs to an individual test case of a job. The user can iterate adding from existing jobs 322-A until finished 326-A and/or iterate through creating test cases 330-A until finished 332-A. In some embodiments, the user can add one or more tasks to a selected node. A task can include steps taken by a user to select a type of validation to perform, and in the process select one or more test cases for a test suite, where the task is said to be initiated when starting execution. A task is assigned a unique ID and the task can include the process of starting a job to completion, where the user can check results and generate a report for the executed test suite. Once the test suite, job, and associated test cases and tasks have been configured, the user can submit a command to end the configuration process. The newly created test suite and/or job is marked as "pending," which indicates that the job is ready for execution. The user can then request execution 328-A.

A configured test suite, job, and/or test cases can be saved to the user's personal menu. In one example, the user can view the status of jobs including pending, configured, active, finished, or canceled. The user can also filter the jobs by stage or status. Moreover, the user can select a specific job from the menu and start, pause, stop, or cancel a routine of the selected job. The user can also view a job's related tasks including details such as task ID, task name, job ID, start time, stop time, task status, task message (e.g., error messages), task files (e.g., log files, html files), and task result (e.g., success, fail). For example, the details of a job (e.g., Job 3) can be presented as "<job 3: suite id 1, created by 3777701014, status: CONFIGURED>." The task details can be presented in a similar way.

In some embodiments, the jobs can be scheduled, canceled, or commenced at any point in time from the testing app 302-A. For example, the user can cause the testing system to execute the job by entering a command at the testing app 302-A (e.g., by actuating a graphical control or inputting a command). The command can cause server-side components to execute pending jobs that were configured by the user.

Test Execution

Test execution 308-A can commence upon successful completion of the test setup 306-A. The collected test suite data 334-A generated during the test setup 306-A is used to execute the test cases on the telecommunications network in accordance with the test protocol (at 328-B). The test execution causes the server-side components to collect performance data of tested nodes in response to performance of the service or operation by the telecommunications network. In some embodiments, the server-side components communicate at least an indication of a test result for display on a display device of the mobile device (at 330-B). The test result includes an indication of the performance data of the particular node of a test case.

A set of standard libraries for test executions can be pre-configured and stored in a repository. Moreover, libraries specifically designed for bots can reside at a bot server. The bot can access and run executions from the standard libraries at the repository by using exposed APIs or the bot-specific libraries, which are more interactive (e.g., a user can interactively set time limits to stop an execution). In either case, an execution status can be stored in a database that is allocated specifically for the bot. As such, the bot can act as an interface for a user to obtain details about a test suite or test case execution.

For example, the bot interacts with the user to run a test suite from a given library of pre-build test suites or a standard preconfigured test suite received from the suite library 338-A. The test suite can commence by using a REST API to access the test suite from the test suite library 338-A. A non-standard test suite can be interactive 340-A. If so, a time limit trigger 342-A is created to start the execution 344-A. When executed, any selected test cases are retrieved from the test library 346-A and then completed when the time trigger is activated 348-A. The result of the execution can be saved to the database 312-A. The suite execution monitor 350-A can periodically check the test suite library 338-A and the test library 346-A.

In some embodiments, a test suite, job, or test case is limited by a restriction policy. Examples of restriction policies include (i) allowed, (ii) allowed and notification is sent to an administrator or the node's owner, and (iii) only allowed if the administer or node's owner gives permission. As such, if a user plans to run a test case that might affect the health of the node or network, the administrator or node's owner can be notified and/or control whether the user will be allowed to cause execution of that test case.

Processing System

Figure 4:
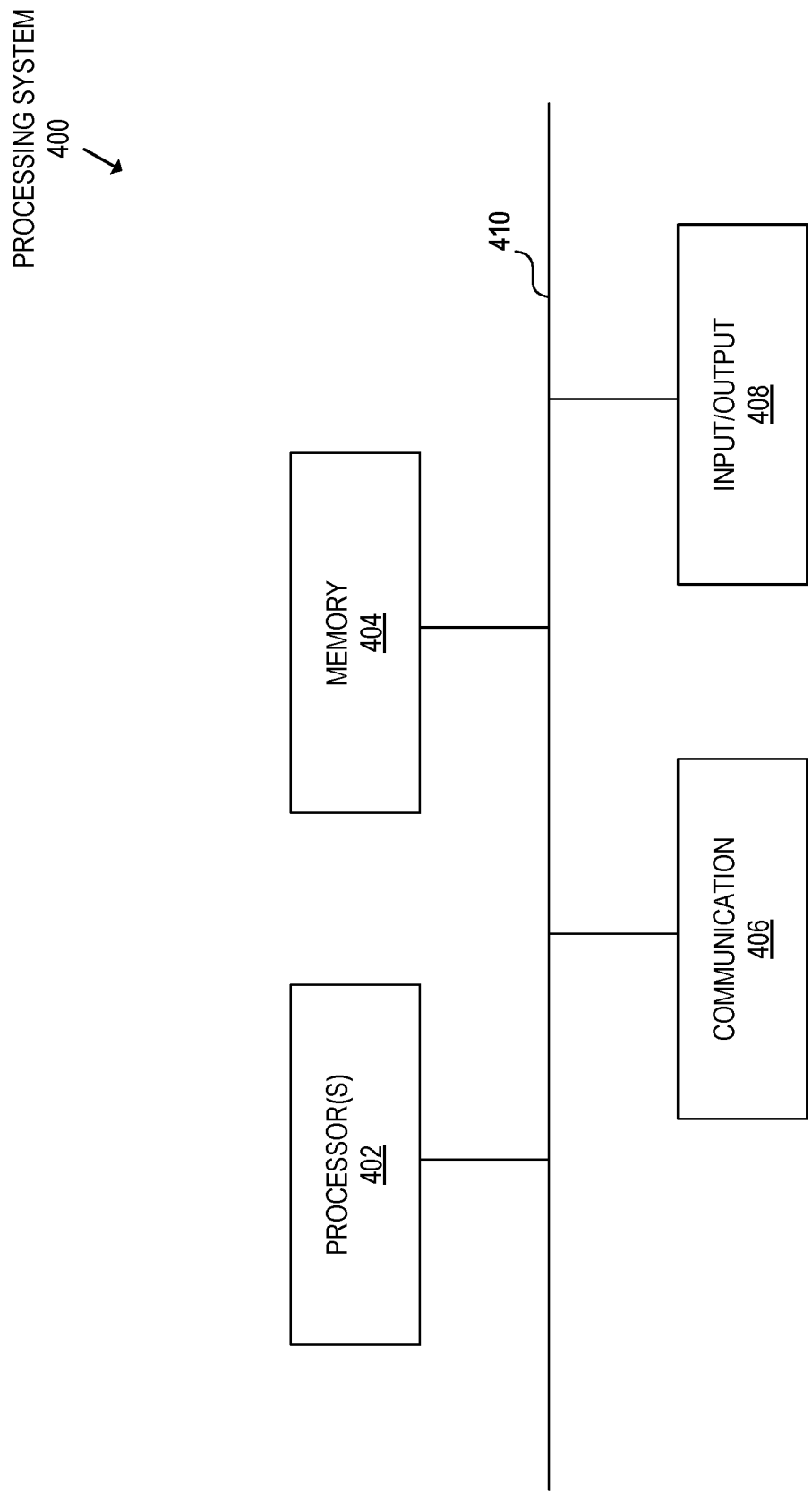
FIG. 4 is a block diagram that illustrates an example processing system in which aspects of the disclosed technology can be embodied.

FIG. 4 is a block diagram illustrating an example of a processing system 400 in which at least some operations described herein can be implemented. The processing system 400 represents a system that can run any of the methods/algorithms described herein. For example, the mobile device 202, test server(s) 208, or network nodes 104 can include or be part of the processing system 400. The processing system 400 can include one or more processing devices, which can be coupled to each other via a network or multiple networks. A network can be referred to as a communication network or telecommunications network.

In the illustrated embodiment, the processing system 400 includes one or more processors 402, memory 404, a communication device 406, and one or more input/output (I/O) devices 408, all coupled to each other through an interconnect 410. The interconnect 410 can be or include one or more conductive traces, buses, point-to-point connections, controllers, adapters and/or other conventional connection devices. Each of the processor(s) 402 can be or include, for example, one or more general-purpose programmable microprocessors or microprocessor cores, microcontrollers, application specific integrated circuits (ASICs), programmable gate arrays, or the like, or a combination of such devices.

The processor(s) 402 control the overall operation of the processing system 400. Memory 404 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 404 can store data and instructions that configure the processor(s) 402 to execute operations in accordance with the techniques described above. The communication device 406 can be or include, for example, an Ethernet adapter, cable modem, Wi-Fi adapter, cellular transceiver, Bluetooth transceiver, or the like, or a combination thereof. Depending on the specific nature and purpose of the processing system 400, the I/O devices 408 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks can instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it can be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method performed by a server computer of a testing system to test performance of a particular node of a telecommunications network, the method comprising:
   receiving an authentication request message issued by a wireless mobile device to authorize a user of the wireless mobile device to remotely administer a test protocol of the testing system from the wireless mobile device,
      wherein the authentication request message is communicated to the server computer over a first type of communication channel and includes identifying information of the user,
   in response to the authentication request message, authenticating the user by:
      matching the identifying information with information stored at a registry of multiple registered users,
         wherein the multiple registered users are pre-authorized to remotely administer test protocols on the network from wireless mobile devices;
      communicating a security token to the wireless mobile device over a second type of communication channel,
         wherein the second type of communication channel is different from the first type of communication channel; and
      receiving a response message issued by the wireless mobile device,
         wherein the response message is received over the first type of communication channel and includes a copy of the security token; and
      authenticating the user by verifying authenticity of the copy of the security token;
   in response to authenticating the user, temporarily authorizing the user to remotely administer the test protocol from the wireless mobile device,
      wherein the temporary authorization terminates upon expiration of a predefined time period during which the user is authorized to remotely administer the test protocol;
   configuring the test protocol based on an instruction issued by the wireless mobile device,
      wherein the test protocol is configured to include a test case for a service or operation to be performed by the telecommunications network and identify the particular node,
   causing execution of the test case on the telecommunications network in accordance with the test protocol,
      wherein execution of the test case causes the server computer to collect performance data of the particular node in response to performance of the service or operation by the telecommunications network; and
   communicating, by the server computer to the wireless mobile device, at least an indication of a result for display on a display device of the wireless mobile device,
      wherein the result includes an indication of the performance data of the particular node.

2. The method of claim 1, wherein the service or operation includes a simulated voice call, the particular node is an IP multimedia subsystem (IMS) node, and the test case is configured to automate collection of log data of the IMS node during the voice call.

3. The method of claim 1, wherein the test case specifies an input, execution condition, testing procedure, or expected result to assess performance of the particular node in response to the service or operation.

4. The method of claim 1, wherein the first type of communication channel is a mobile broadband communication channel and the second type of communication channel is an SMS communication channel.

5. The method of claim 1, wherein configuring the test protocol based on the instruction issued by the wireless mobile device comprises:
   adding a test case for each of multiple nodes of the telecommunications network,
   wherein each test case and each of the multiple nodes are selected at the wireless mobile device.

6. The method of claim 1, wherein the particular node is a Telephony Application Server (TAS) node or a Call Session Control Function (CSCF) node.

7. The method of claim 1 further comprising, prior to receiving the authentication request message issued by the wireless mobile device:
   receiving a registration request message to register the user with the testing system,
      wherein the registration request message includes unique information that identifies the user;
   in response to the registration request message to register the user, communicating a notification to a computing device of an administrator user of the testing system,
      wherein the notification enables the administrator user to grant registration of the user with the testing system,
   receiving an indication that the administrator user granted registration of the user with the testing system; and
   in response to receiving the indication that the administrator user granted registration of the user with the testing system, storing an indication of the registration of the user at the registry of the multiple registered users.

8. The method of claim 1, wherein authenticating the user further comprises:
   communicating a notification to a computing device of an administrator user of the testing system,
      wherein the notification enables the administrator user to grant the temporary authorization of the user to remotely administer the test protocol from the wireless mobile device; and
   receiving an indication that the administrator granted the temporary authorization of the user.

9. The method of claim 1, wherein configuring the test protocol based on the instruction issued by the wireless mobile device comprises:
   receiving the instruction as issued by a virtual agent of a testing application running on the wireless mobile device,
      wherein the instruction is generated by the virtual agent based on a natural language command input by the user of wireless mobile device.

10. The method of claim 1, wherein the registry of the multiple registered users includes a time period associated with each registered user, the method further comprises, prior to configuring the test protocol:
    receiving a timestamp generated by the wireless mobile device,
       wherein receipt of the timestamp commences the time period associated with the registered user as indicated in the registry.

11. The method of claim 1, wherein temporarily authorizing the user to remotely administer the test protocol from the wireless mobile device comprises:
    enabling access to multiple preconfigured test cases for the testing system, wherein each preconfigured test case includes at least one of a specific service or operation to be performed by the telecommunications network or an identification of a specific node subject to a performance assessment.

12. The method of claim 1, wherein configuring the test protocol based on the instruction issued by the wireless mobile device comprises:
receiving an indication that the test case is one of multiple preconfigured test cases selected by the user on the wireless mobile device; and
retrieving the test case form a library of the preconfigured test cases.

13. The method of claim 1, wherein configuring the test protocol based on the instruction issued by the wireless mobile device comprises:
receiving an indication of a selection of the particular node of the test case; and
associating the test case with the particular node in the test protocol.

14. The method of claim 1, wherein the test case includes a log collection automation script to collect log data of the particular node in response to the test case.

15. A system comprising:
a handheld mobile device including:
a display device;
one or more processors; and
a memory coupled to the one or more processors, wherein the memory includes instructions which, when executed by the one or more processors, cause the handheld mobile device to:
initiate a multi-factor authentication process to authenticate a user of the handheld mobile device with a testing system of a telecommunications network,
wherein the testing system is configured to test performance of one or more nodes of the telecommunications network, and
temporarily authenticate the user with the testing system based on a successful completion of the multi-factor authentication process,
wherein the user is de-authenticated upon expiration of a predefined time period that commences in response to the successful completion of the multi-factor authentication process;
in response to the temporary authentication of the user, instantiate a virtual agent configured to interact with the user to remotely administer a test suite on the telecommunications network;
remotely administer the test suite based on an interaction between the user and the virtual agent by causing the processor to:
configure the test suite to associate a particular test case with a particular node of an IP multimedia subsystem (IMS) of the telecommunications network,
wherein the particular test case includes a configuration to perform a voice call on the telecommunications network;
initiate the test suite from the handheld mobile device for the telecommunications network,
wherein the test suite initiates the voice call and causes automated collection of performance data of the particular node in response to the voice call; and
display, on the display device, at least an indication of performance data of the particular node in response to the voice call.

16. The system of claim 15, wherein the voice call is a Voice over Long-Term Evolution (VoLTE) call and the particular node includes a Telephony Application Server (TAS) or a Call Session Control Function (CSCF).

17. The system of claim 15, wherein:
the memory stores a mobile software application that includes the instructions,
the multi-factor authentication process is initiated through the mobile software application running on the handheld mobile device, and
the indication of the performance data is displayed on a user interface of the mobile software application displayed on the display device.

18. A method performed by at least one computing device, the method comprising:
obtaining an indication that a user is temporarily authenticated with a testing system of a telecommunications network,
wherein the testing system is configured to test performance of one or more nodes of the telecommunications network, and
wherein the user is de-authenticated upon expiration of a predefined time period that starts when the user is temporarily authenticated;
in response to obtaining the indication that the user is temporarily authenticated, instantiating a virtual agent configured to interact with the user to remotely administer a test suite on the telecommunications network;
causing the virtual agent to configure the test suite based on a first interaction between the user and the virtual agent,
wherein the test suite is configured to associate a particular test case with a particular node of the telecommunications network, and
wherein the particular test case is configured to perform a voice call on the telecommunications network;
causing the virtual agent to execute the test suite on the telecommunications network based on a second interaction between the user and the virtual agent,
wherein the test system initiates the voice call on the telecommunications network and causes automated collection of performance data of the particular node during the voice call; and
causing display, on a display device, of an indication of the collected performance data of the particular node.

19. The method of claim 18, wherein the computing device is a handheld mobile device.

20. At least one non-transitory, computer-readable medium, carrying instructions that, when executed by at least one data processor of a system, cause the system to:
obtain an indication that a user is temporarily authenticated with a testing system of a telecommunications network,
wherein the testing system is configured to test performance of one or more nodes of the telecommunications network, and
wherein the user is de-authenticated upon expiration of a predefined time period that starts when the user is temporarily authenticated;
in response to obtaining the indication that the user is temporarily authenticated, instantiate a virtual agent configured to interact with the user to remotely administer a test suite on the telecommunications network;
cause the virtual agent to configure the test suite based on a first interaction between the user and the virtual agent, wherein the test suite is configured to associate a particular test case with a particular node of the telecommunications network, and wherein the particular test case is configured to perform a voice call on the telecommunications network;

cause the virtual agent to execute the test suite on the telecommunications network based on a second interaction between the user and the virtual agent, wherein the test system initiates the voice call on the telecommunications network and causes automated collection of performance data of the particular node during the voice call; and cause display, on a display device, of an indication of the collected performance data of the particular node.

* * * * *